UNITED STATES PATENT OFFICE.

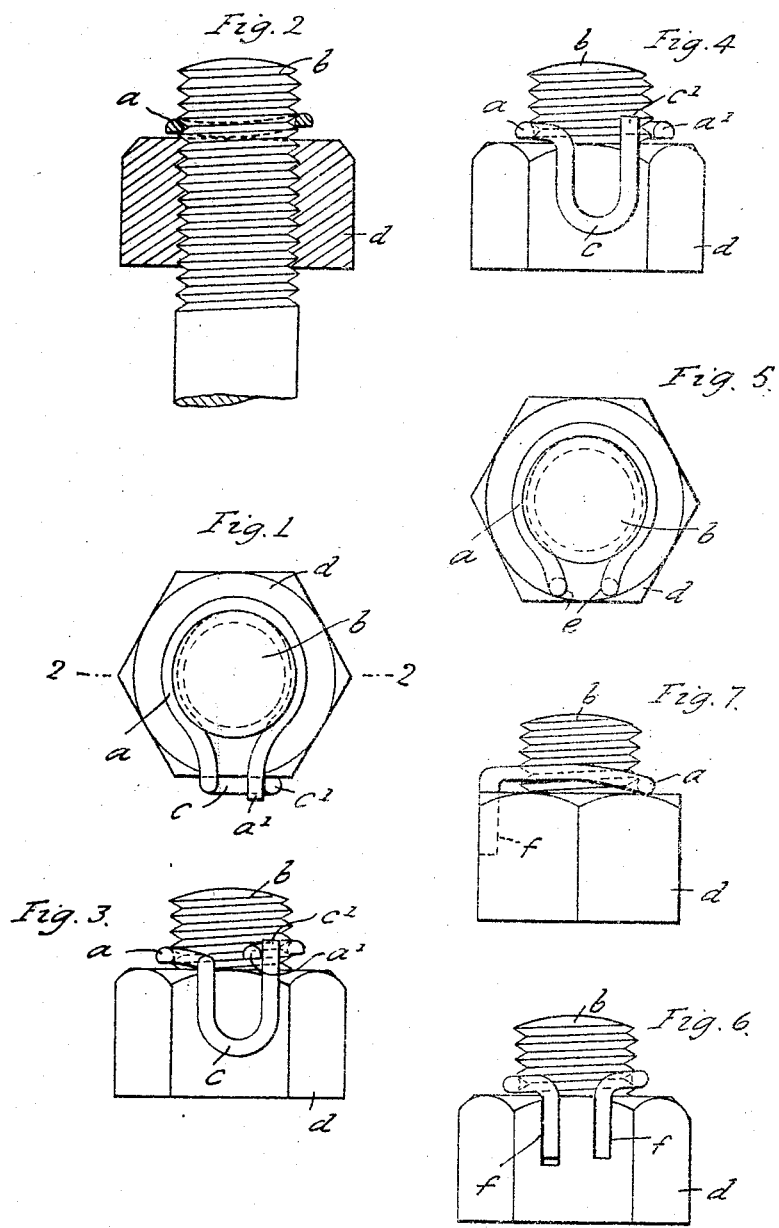

OSWALD NETTLEFOLD, OF LONDON, ENGLAND.

DEVICE FOR LOCKING NUTS AND THE LIKE.

1,366,273.   Specification of Letters Patent.   Patented Jan. 18, 1921.

Application filed February 10, 1920. Serial No. 357,758.

*To all whom it may concern:*

Be it known that I, OSWALD NETTLEFOLD, a subject of the King of Great Britain, residing in London, England, have invented certain new and useful Improvements in Devices for Locking Nuts and the like, of which the following is a specification.

The object of this invention is to provide a cheap and effective device for preventing the unscrewing of nuts or the like otherwise than by design. The device is applicable to any nut having a flat side or sides without any modification whatever, either of the nut or of the bolt or stud to which it is applied, and also in a modified form to turret nuts or to any nut or the like having a circular periphery, as long as it is provided with tommy holes or their equivalent either on the edge or the face. Other cases can be met by a simple and inexpensive modification of the nut or the like.

The improved device consists essentially of a metal band adapted to engage a thread or threads of the bolt or stud to which the nut is applied and in the locking position to be anchored to the nut at its two ends with the band in tension closely engaging and cross threading one or more of the threads of the bolt.

Although the invention will be hereinafter described more particularly with reference to ordinary hexagonal or square nuts, it will be understood that it is applicable in one or other of the forms described or with but slight modifications thereof obvious to any skilled mechanic to other shapes of nuts, screwed glands or the like.

In the accompanying drawings Figure 1 is a plan view of a hexagonal nut on a bolt showing one form of the improved device applied thereto in the locking position; Fig. 2 is a section on line 2—2 of Fig. 1; Fig. 3 is a front elevation and Fig. 4 a corresponding view with the device at "lock free"; Fig. 5 is a plan view showing a modified construction of locking device; Fig. 6 is a front elevation and Fig. 7 a side elevation showing a further modification.

In the various constructions shown the locking device consists of a loop of spring steel wire $a$ bent approximately to the diameter of the bolt $b$ and embracing more than half its periphery. That end of the loop which is anchored to the nut when the device is applied will be identified throughout this description as the anchored end, while the other end which is anchored to the nut only in the "lock-fast" condition of the device will be called the locking end.

In the construction of Figs. 1-4, the anchored end of the loop $a$ takes the form of a second loop or hooked part $c$ at right angles to the plane of the loop $a$ and adapted to set flat against one of the sides of the hexagon nut $d$, the end $c'$ of the loop $c$ projecting a certain distance above the top or face of the nut to act as a stop for the free end $a'$ of the loop $a$ which in the lock-fast position shown in Figs. 1 and 3 is sprung over the stop $c'$ and so anchored to the nut. It will be seen that in the lock-fast position, the loop $a$ is close down on the top of the nut at one point and crosses the thread of the bolt at an intermediate point of its length so as to lie partly in the thread nearest the face of the bolt and partly in the next thread.

It is essential that the loop $a$ should be held cross-threaded in this manner in the lock-fast condition of the device. For example, if the locking device shown in Figs. 1-4 is applied by placing the loop $c$ flat against one of the hexagon flats of the nut and the loop $a$ flat against the top of the nut and coaxial therewith and screwing the nut and locking device together on to the bolt until the nut is tight against its work, the device is made "lock-fast" by springing the end $a'$ over the stop $c'$ and the height of this stop above the face or top of the nut must be sufficient to insure the cross threading of the loop $a$ when springing one end over the other. Alternatively the loop $a$ itself or the ends thereof, or the means for anchoring these ends, must be so formed that however applied the loop $c'$ will crossthread the bolt in the lock-fast condition of the device.

To unlock the nut it is necessary merely to spring the locking end $a'$ of the loop over the stop $c'$ into the "lock-free" position shown in Fig. 4, thereby relieving the tension on the loop $a$ and enabling the nut to be unscrewed. It will be noted that with the device in the "lock-free" condition the nut can be unscrewed freely just as easily as any ordinary nut to which no locking device is applied and does not demand the use of a spanner in unscrewing.

In the modified construction of Fig. 5 the two ends of the loop $a$ are simply turned at right angles to the plane of the loop to engage in holes $e$ formed in the nut. Cross threading of the device in the lock-fast condition may be insured in this case by making one of the holes $e$ of less depth than the other or one of the inturned ends of greater length than the other. The distance between the holes $e$ and the diameter of the loop $a$ is such that when the locking end of the loop is sprung into its stop hole $e$ the loop will be in tension and in close engagement with the thread of the bolt.

The modified construction shown in Figs. 6 and 7 differs from that last described only in the substitution of the slots $f$ in one of the sides of the nut for the holes $e$ in the top thereof. The same device may be applied for insuring cross-threading, viz. making one of the slots $f$ shorter than the downwardly turned end of the loop which engages in that slot.

The size of the wire used for the device may vary considerably, the limits depending of course upon the size of the thread on the bolt, but it is preferable that the diameter of the wire should be such that when fitting snugly in the thread the surface of the wire should project beyond the ridge of the thread. As shown in Figs. 1–4, the wire may be of flattened section (or it may be of any other suitable section), the flat being provided in this case more particularly to enable the loop $c$ to be snugly fitted against the side of the nut.

Having thus described the nature of the said invention and the best means I know of carrying the same into practical effect, I claim:—

1. A device for locking nuts or the like, consisting of a metal band adapted to engage the thread of the bolt or stud to which the nut is applied and to be anchored to the nut at both ends with the band closely engaging and cross-threading the thread of the bolt in the lock-fast position, substantially as described.

2. A device for locking nuts or the like, consisting of a metal band adapted to engage the thread of the bolt or stud to which the nut is applied and to have its ends interlocked with the band closely engaging and cross-threading the thread of the bolt in the lock fast position.

In testimony whereof I have signed my name to this specification.

OSWALD NETTLEFOLD.